US007078880B2

(12) United States Patent
Potter et al.

(10) Patent No.: US 7,078,880 B2
(45) Date of Patent: Jul. 18, 2006

(54) ENERGY STORAGE FLYWHEEL VOLTAGE REGULATION AND LOAD SHARING SYSTEM AND METHOD

(75) Inventors: Calvin C. Potter, Mesa, AZ (US); Stephen G. Abel, Chandler, AZ (US); George J. Klupar, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 143 days.

(21) Appl. No.: 10/641,509

(22) Filed: Aug. 15, 2003

(65) Prior Publication Data
US 2005/0035744 A1 Feb. 17, 2005

(51) Int. Cl.
H02K 7/02 (2006.01)
H02P 9/10 (2006.01)
H02P 9/14 (2006.01)
H02P 9/00 (2006.01)
B64G 1/28 (2006.01)

(52) U.S. Cl. .............................. 322/4; 322/59; 244/165
(58) Field of Classification Search .................... 322/4, 322/59; 244/165; 318/768, 771
See application file for complete search history.

(56) References Cited

U.S. PATENT DOCUMENTS

| 4,001,666 | A |   | 1/1977  | Grenfell ........................ 322/4 |
|-----------|---|---|---------|----------------------------------------|
| 4,495,451 | A |   | 1/1985  | Barnard ...................... 318/150 |
| 4,612,494 | A |   | 9/1986  | Kawamura .................... 322/4 |
| 4,723,735 | A |   | 2/1988  | Eisenhaure et al. ......... 244/165 |
| 5,308,024 | A | * | 5/1994  | Stetson, Jr. ................. 244/165 |
| 5,611,505 | A |   | 3/1997  | Smay ......................... 244/165 |
| 5,692,707 | A | * | 12/1997 | Smay ......................... 244/165 |
| 5,921,505 | A |   | 7/1999  | Spector ....................... 244/165 |
| 6,020,657 | A |   | 2/2000  | Liran ........................... 307/64 |
| 6,072,302 | A | * | 6/2000  | Underwood et al. .......... 322/17 |
| 6,113,033 | A | * | 9/2000  | Parks et al. ................. 244/165 |
| 6,234,427 | B1|   | 5/2001  | Decker ....................... 244/173 |
| 6,240,337 | B1|   | 5/2001  | Marr, Jr. et al. ............ 700/286 |
| 6,311,931 | B1| * | 11/2001 | Smay ......................... 244/164 |
| 6,396,186 | B1|   | 5/2002  | Post ........................... 310/198 |
| 6,433,444 | B1|   | 8/2002  | de Vries ...................... 307/64 |
| 6,439,510 | B1|   | 8/2002  | Barde ......................... 244/165 |
| 6,441,581 | B1|   | 8/2002  | King et al. .................. 320/101 |
| 6,700,214 | B1| * | 3/2004  | Ulinski et al. ............ 290/40 C |
| 6,779,759 | B1| * | 8/2004  | Klupar et al. ............... 244/165 |
| 6,845,952 | B1| * | 1/2005  | Abel et al. .................. 244/165 |
| 6,882,072 | B1| * | 4/2005  | Wingett et al. ............... 310/74 |
| 6,975,946 | B1| * | 12/2005 | Al-Hamrani ................. 702/60 |

* cited by examiner

Primary Examiner—Darren Schuberg
Assistant Examiner—Pedro J. Cuevas
(74) Attorney, Agent, or Firm—Ingrassia Fisher & Lorenz

(57) ABSTRACT

A system for regulating the voltage in an electrical distribution system includes a plurality of flywheels, motor/generators, and controllers. Each of the motor/generators is coupled to one of the energy storage flywheels and to the electrical supply system. The motor/generators each supply one or more signals representative of motor/generator operational parameters, and each motor/generator controllers receive one or more of the motor/generator operational parameter signals from each of the motor/generators. In response to the operational parameter signals, the motor/generator controllers each control the operation of one of the motor/generators in either a motor mode or a generate mode, to thereby regulate the electrical supply system voltage and equally share the electrical load between the motor/generators.

16 Claims, 5 Drawing Sheets

ENERGY STORAGE FLYWHEEL VOLTAGE REGULATION AND LOAD SHARING SYSTEM AND METHOD

FIELD OF THE INVENTION

The present invention relates to energy storage flywheel systems and, more particularly, to a system and method of regulating voltage supplied from, and load sharing among, energy storage flywheel systems.

BACKGROUND OF THE INVENTION

Many satellites and other spacecraft, as well as some terrestrial stationary and vehicle applications, such as sea-going vessels, include electrical distribution systems that have both a primary electrical power source and a backup electrical power source. For example, many satellites include an array of solar cells, which may be attached to the satellite itself or to solar panels that extend from the satellite. The solar arrays are typically the primary electrical power source whenever the satellite is exposed to the sun. However, a satellite can experience periodic eclipses from the sun when the satellite's orbit moves it into the Earth's shadow. During these eclipse periods, a backup power source is used to supply electrical power. In addition, while the solar arrays may be sized to handle at least nominal design power loads, the arrays may not be sized to handle transient and/or peak design power loads. Thus, the backup power source may also be used during periods of transient and/or peak power demands to augment the solar arrays.

In some spacecraft systems, the backup power source is one or more rechargeable batteries. During eclipse periods, transients, and/or peak power demand periods, the batteries supply some or all of the electrical power to the satellite's electrical distribution system, causing the batteries to discharge. Thereafter, the batteries are recharged to capacity using excess electrical energy from the solar arrays. The lifetime of many batteries is limited according to a number of charge-discharge cycles. In addition, some batteries are relatively heavy. Thus, some satellites plan to include one or more energy storage flywheel systems to either supplement or replace batteries as the backup power source. In some satellite concepts, energy storage flywheel systems are used as both a backup power source, and to supply attitude control for the satellite.

Energy can be stored in various forms, including as electrical energy or as mechanical kinetic energy. Energy storage flywheel systems may be thought of as "mechanical batteries," that convert electrical energy into rotational kinetic energy, and rotational kinetic energy into electrical energy. Energy storage flywheel systems can include one or more flywheels that are rotationally mounted using magnetic bearings, and that are coupled to a motor/generator and, if also used for attitude control, may be coupled to a gimbal actuator. To convert electrical energy to rotational kinetic energy, the motor/generator is operated in a motor mode and is used to rotate the flywheel up to a relatively high rotational speed. To convert the stored kinetic energy to electrical energy, the motor/generator is operated in a generator mode and is rotated by the flywheel to generate electrical energy.

The operation of each motor/generator is preferably controlled in such a manner as to provide stable power bus voltage. However, in many instances the motor/generators are controlled using individual controllers that implement fairly simple control schemes. This can result in unbalanced load sharing among the flywheels and other components in the system, which can in turn result in speed mismatches, undesirable heating, reduced reliability, and circuit and component failures.

Hence, there is a need for a system and method of controlling energy storage flywheel system motor/generators that regulates system voltage, while providing balanced load sharing amongst a plurality of flywheel systems, and/or reduces undesirable heating, and/or increases system reliability, and/or reduces the likelihood of circuit and component failures. The present invention addresses one or more of these needs.

SUMMARY OF THE INVENTION

The present invention provides a system and method of controlling energy storage flywheel system motor/generators to regulate motor/generator voltage, while providing balanced load sharing amongst a plurality of flywheel systems.

In one embodiment, and by way of example only, a system for regulating voltage in an electrical supply system includes a plurality of energy storage flywheels, a plurality of motor/generators, and a plurality of motor/generator controllers. Each motor/generator is coupled to one of the energy storage flywheels and to the electrical supply system and is configured to operate in either a motor mode, whereby electrical energy from the electrical supply system is converted to rotational kinetic energy and supplied to its respective energy storage flywheel, or a generate mode, whereby rotational kinetic energy from its respective energy storage flywheel is converted to electrical energy and supplied to the electrical supply system. Each motor/generator is further configured to supply one or more signals representative of motor/generator operational parameters. Each motor/generator controller is coupled to receive one or more of the motor/generator operational parameter signals from each of the motor/generators and is operable, in response thereto, to control the operation of one of the motor/generators in either the motor mode or the generate mode, to thereby regulate the electrical supply system voltage and substantially equally share electrical load between the motor/generators.

In another exemplary embodiment, in a system having a plurality of energy storage flywheels configured to supply one or more signals representative of flywheel operational parameters, and a plurality of motor/generators each coupled to one of the energy storage flywheels and an electrical supply system and configured to supply one or more signals representative of motor/generator operational parameters, a method of regulating bus voltage in the electrical supply system includes controlling each motor/generator based at least in part on one or more of the motor/generator operational parameter signals supplied from each of the motor/generators to thereby regulate the electrical supply system bus voltage and substantially equally share electrical load between the motor/generators.

Other independent features and advantages of the preferred flywheel voltage regulation system and method will become apparent from the following detailed description, taken in conjunction with the accompanying drawings which illustrate, by way of example, the principles of the invention.

DETAILED DESCRIPTION OF A PREFERRED EMBODIMENT

Before proceeding with a detailed description, it is to be appreciated that the described embodiment is not limited to use in conjunction with a spacecraft. Thus, although the present embodiment is, for convenience of explanation, depicted and described as being implemented in a satellite, it will be appreciated that it can be implemented in other systems and environments, both terrestrial and extraterrestrial.

Figure 1:
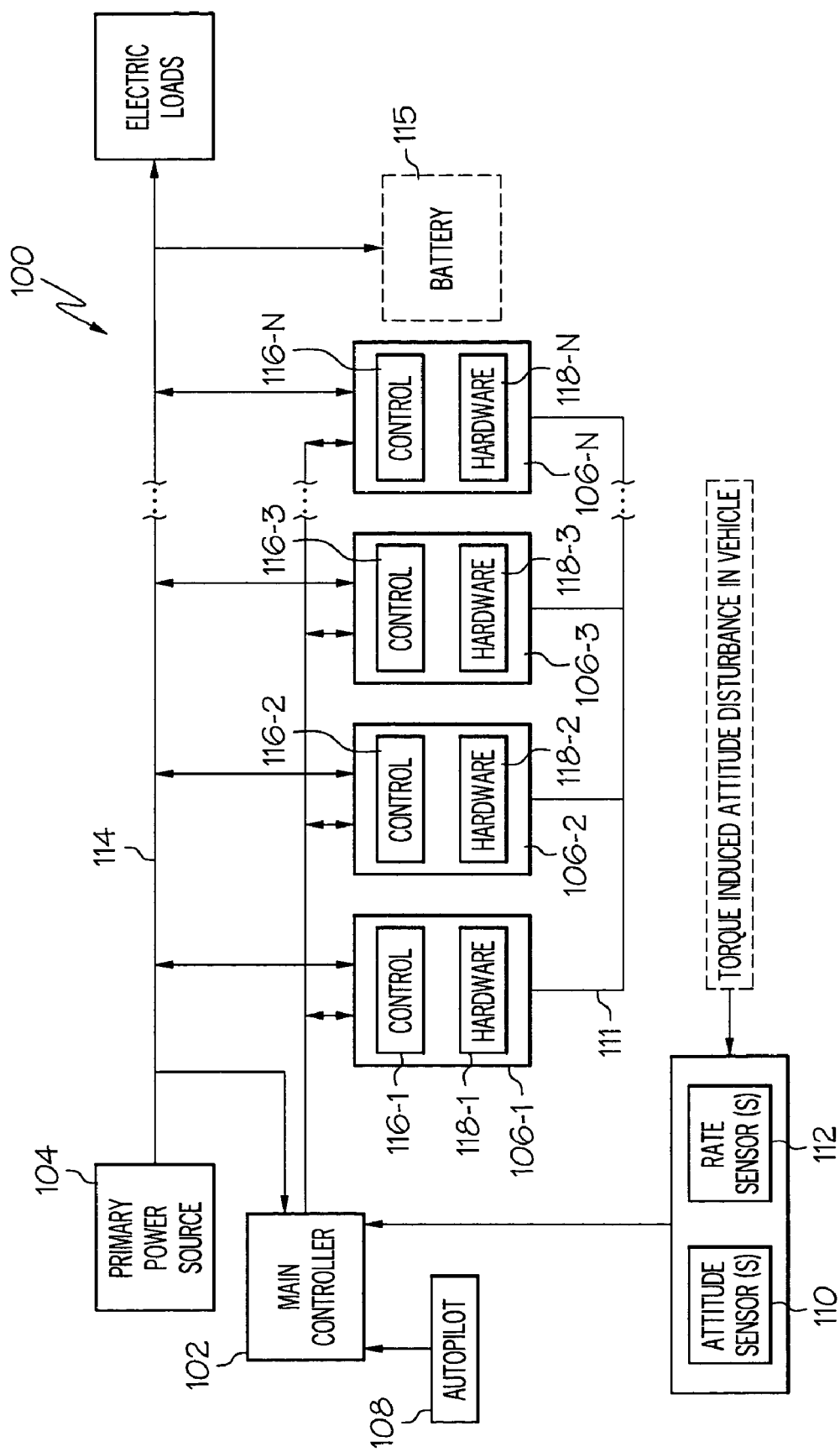
FIG. 1 is a functional block diagram of an exemplary embodiment of a power and attitude control system for a spacecraft.
Figure 2:
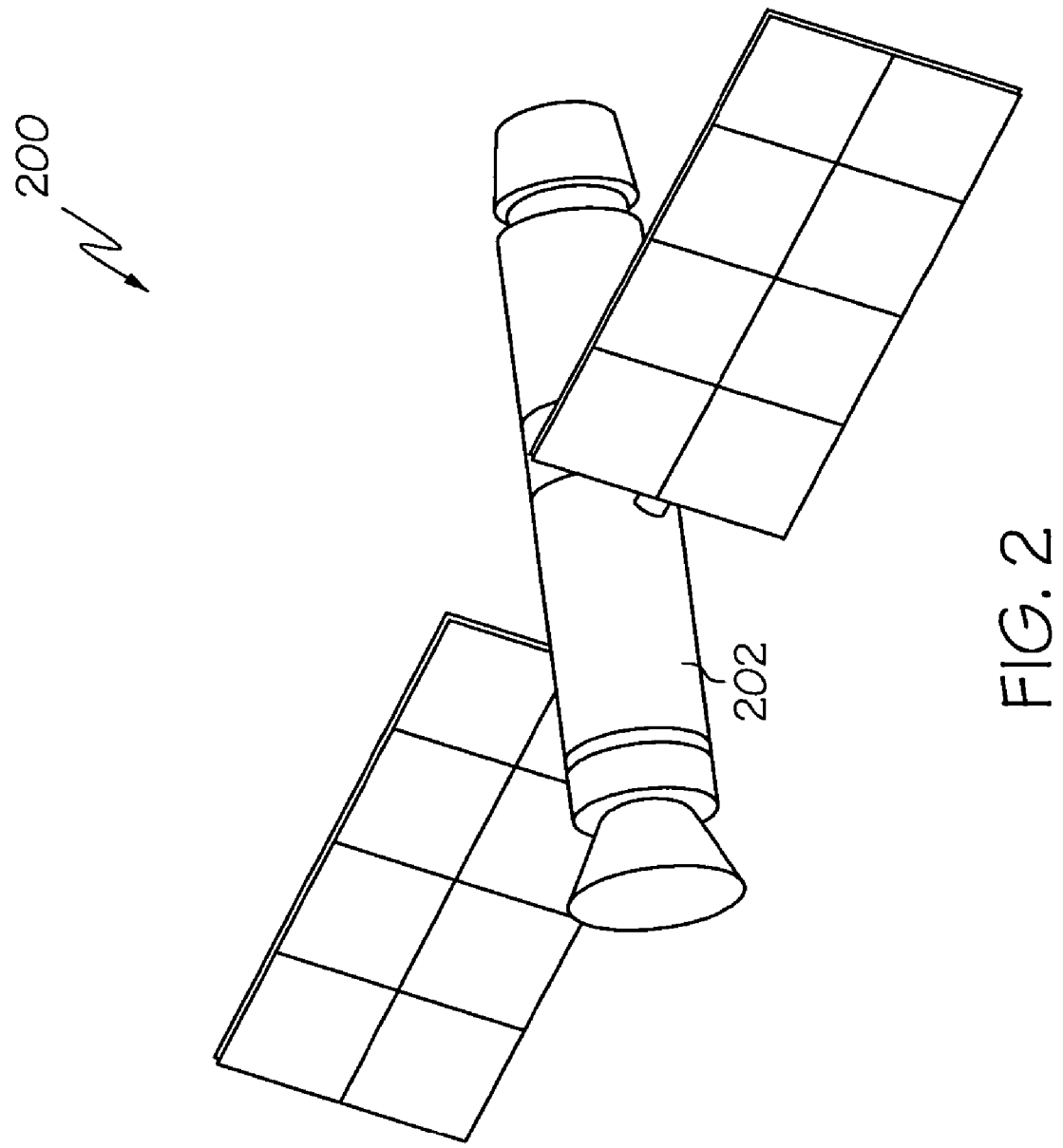
FIG. 2 is a perspective view of a physical embodiment of a satellite system that may incorporate the system of FIG. 1.

Turning now to the description and with reference first to FIG. 1, a functional block diagram of an exemplary power and attitude control system 100 for a spacecraft is shown. The system 100 includes a main controller 102, a primary power source 104, and a plurality of energy storage flywheel systems 106 (106-1, 106-2, 106-3, ... 106-N). A perspective view of an exemplary physical embodiment of a spacecraft 200 that may use the system 100 is illustrated in FIG. 2.

The main controller 102 receives attitude commands (or torque commands) from, for example, an earthbound station or its onboard autopilot 108, and monitors the electrical power distribution system 114, and appropriately controls the operation of the flywheel systems 106. In response to the torque commands, the flywheel systems 106 are controlled to induce appropriate attitude disturbances in the spacecraft, and thereby control spacecraft attitude. In addition, depending upon the state of the electrical distribution system 114, the flywheels 106 are controlled to either supply electrical energy to, or draw electrical energy from, the electrical distribution system. One or more spacecraft dynamic sensors, such as one or more attitude sensors 110 and one or more rate sensors 112, sense spacecraft attitude and attitude rate-of-change, respectively, and supply feedback signals representative thereof to the main controller 102.

The primary power source 104, as its name connotes, is the primary source of electrical power to the electrical power distribution system 114. In the depicted embodiment, in which the system 100 is implemented in a spacecraft, the primary power source 104 is one or more solar panels, each of which includes an array of solar cells to convert light energy into electrical energy. The solar panels 104 may be attached to the satellite itself or to fixed or moveable structures that extend from the satellite. When the spacecraft 200 is positioned such that it does not receive sunlight, such as, for example, when it is in the Earth's shadow, a backup electrical power source is needed. As was alluded to above, in addition to providing attitude control, the flywheel systems 106 also function as a backup power source. The flywheel systems 106 may also provide electrical power if the power demanded by the electrical loads exceeds the capacity of the primary power source 104. It will be appreciated that another backup power source, such as a battery 114 (shown in phantom in FIG. 1), may also be provided.

The system 100 includes N number of energy storage flywheel systems 106 (106-1, 106-2, 106-3, ... 1-6-N). The system 100 is preferably configured so that some of the flywheel systems 106 are active, while one or more of the remaining flywheel systems 106 is in a standby, inactivated state. Thus, the system 100 is at least single fault tolerant. The number of flywheel systems 106 that are active may vary, depending on system requirements. As will be discussed more fully below, in a particular preferred embodiment, four flywheel systems 106 are active and the remaining are inactive.

Figure 3:
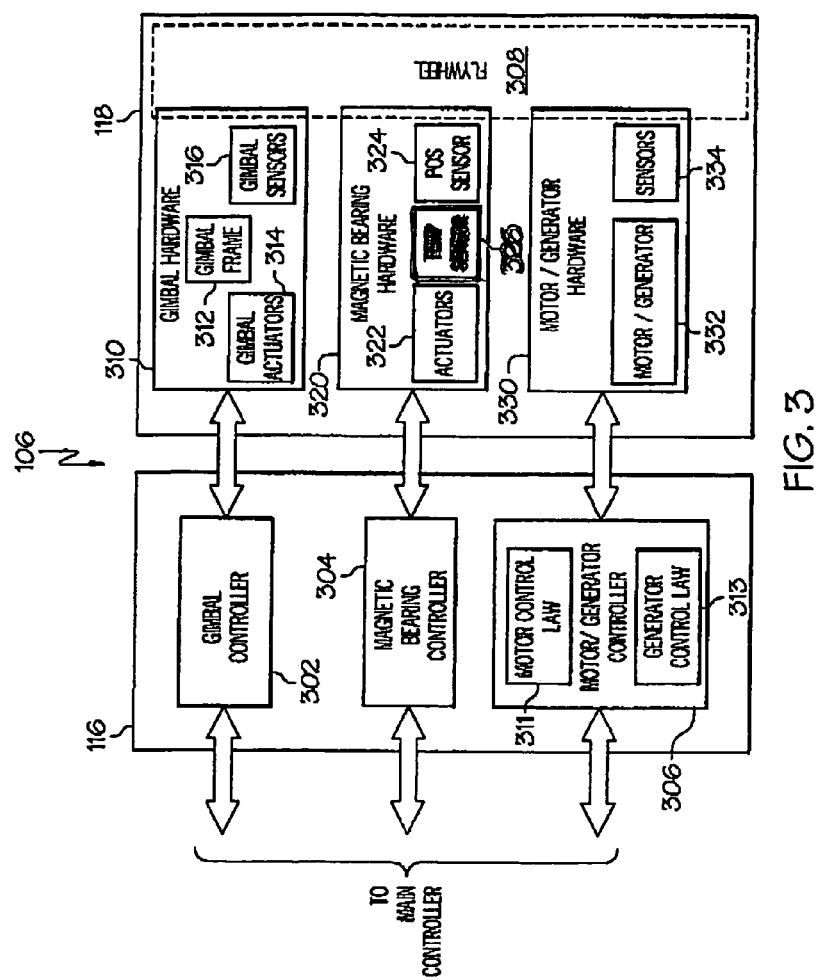
FIG. 3 is a functional block diagram of an exemplary embodiment of one flywheel system that may be used in the system of FIG. 1.

The flywheel systems 106 each include a flywheel control module 116 (116-1, 116-2, 116-3, ... 116-N) and flywheel hardware 118 (118-1, 118-2, 118-3, ... 118-N). The flywheel control modules 116 are each in operable communication with the main controller 102 and, in the depicted embodiment, are in communication with one another via a data bus 111. The main controller 102, as was noted above, supplies attitude control commands to the each of the flywheel control modules 116. In turn, the flywheel control modules 116 control the relative attitudes and angular velocities of the associated flywheel hardware 118 to effect attitude control of the spacecraft 200. The flywheel control modules 116 also respond to commands from the main controller 102 to control the operation of the associated flywheel hardware 118 in either a motor mode or a generator mode, and the rotational acceleration of the associated flywheel hardware 118 in each mode. The flywheel control modules 116, as is discussed in more detail below, also monitor various parameters of the associated flywheel hardware 118, and supply representative signals to the main controller 102. A block diagram of an exemplary embodiment one flywheel system 106 is illustrated in FIG. 3, and will now be discussed in detail.

The flywheel control modules 116 each include three separate controllers, a gimbal controller 302, a magnetic bearing controller 304, and a motor/generator controller 306. The flywheel hardware modules 118 each include an energy storage flywheel 308, gimbal hardware 310, magnetic bearing hardware 320, and motor/generator hardware 330. The gimbal controller 302 receives gimbal angle velocity commands from the main controller 102, and supplies appropriate control signals to, and receives various feedback signals from, the gimbal hardware 310, to effect attitude control. At least some of the feedback signals the gimbal controller 310 receives are representative of the gimbal hardware 310 response to the supplied control signals. The gimbal controller 302 also supplies these feedback signals to the main controller 102.

In the depicted embodiment, the gimbal hardware 310 includes a gimbal frame 312, one or more gimbal actuators 314, and one or more gimbal sensors 316. The flywheel 308 is mounted in the gimbal frame 312. The gimbal frame 312 is rotationally mounted about one gimbal axis, which is perpendicular to the spin axis of the energy storage flywheel 308. The gimbal actuators 314 are coupled to the gimbal frame 312, and are also coupled to receive the control signals from the gimbal controller 302. As is generally known, attitude control in a spacecraft may be implemented by changing the gimbal angles at certain rates (e.g., angular velocities). Thus, in response to the commands received from the main controller 102, the gimbal controller 302 supplies appropriate control signals to the gimbal actuators 314. In response to these control signals, the gimbal actuators appropriately position the gimbal frame 312 at the appropriate angular velocities. The gimbal sensors 316 include sensors that can sense at least the position and rate of the gimbal frame 312, and supply position and rate feedback signals to the gimbal controller 302 and to the main controller 102.

The magnetic bearing controller 304 may also receive one or more signals from the main controller 102. The magnetic bearing controller 304, in accordance with a control law, supplies appropriate command signals to, and receives various feedback signals from, the magnetic bearing hardware 320. At least some of the feedback signals received by the magnetic bearing controller 304 are representative of the magnetic bearing hardware 320 response to the supplied control signals. Similar to the gimbal controller 302, the magnetic bearing controller 304 may supply one or more of the feedback signals it receives to the main controller 102.

The magnetic bearing hardware 320 functions to rotationally mount or levitate, in non-contact fashion, the energy storage flywheel 106. In the depicted embodiment, the magnetic bearing hardware 320 implements active magnetic bearings, and includes electromagnetic actuators 322 and position sensors 324. The position sensors 324 sense the position of the flywheel rotor (not illustrated) and supply appropriate position signals to the magnetic bearing controller 304. The magnetic bearing controller 304, in accordance with the control law, supplies the appropriate current magnitude to the electromagnetic actuators 322, which in turn generate magnetic forces of the appropriate magnitude to appropriately position the flywheel rotor. As FIG. 3 also depicts, the magnetic bearing hardware 320 may include one or more temperature sensors 326. Although a full compliment of active magnetic bearings are shown in FIG. 3, it will be appreciated that the magnetic bearing hardware 320 could be configured to implement some passive magnetic bearings, or non-magnetic rolling element bearings.

The motor/generator hardware 330 includes a motor/generator 332 and one or more sensors 334. The motor/generator 332 may be any one of numerous motor/generator sets known now, or in the future, including numerous types of AC and DC motor/generators. In a preferred embodiment, however, the motor/generator is a brushless DC motor/generator, and includes a main rotor that is coupled to the rotor of the flywheel 308. The sensors 334 include one or more temperature sensors, one or more commutation sensors, one or more rotational speed sensors, and one or more current sensors. The motor/generator 332 may be configured to operate in either a motor mode or a generate mode. During operation in the motor mode, the motor/generator 332 converts electrical energy from the electrical power distribution system 114 to rotational kinetic energy, which spins up the flywheel 308 and stores rotational kinetic energy therein. During operation in the generate mode, the motor/generator 332 spins down the flywheel 308, converting the flywheel's stored rotational kinetic energy to electrical energy, which is supplied to the electrical power distribution system 114.

The motor/generator controller 306 receives a signal 338 (see FIG. 4) representative of the bus voltage of the spacecraft electrical distribution system 114, and a reference voltage signal 342 from a reference voltage source 340. It will be appreciated that the reference voltage source 340 may form part of the main controller 102. The motor/generator controller 306 additionally receives one or more signals representative of various operational parameters associated with its respective flywheel system 108, as well as various operational parameters associated with the other flywheels systems 108. In particular, the motor/generator controller 306 receives a signal representative of the rotational speed 344-1 of its own motor/generator 332 (and thus its own flywheel 106-1), and signals representative of the rotational speed 344-2, 344-3, 344-4, . . . 344-N of the motor/generators 332 in the other flywheel systems 106-2, 106-3, 106-4, . . . 106-N. The motor/generator controller 306 also receives a signal representative of the current 346-1 supplied to, or from, its own motor/generator 332, depending upon whether the motor/generator is operating in the motor mode or generate mode, respectively. In an alternative embodiment, the motor/generator controller 332 also receives signals representative of the motor/generator current 346-2, 346-3, 346-4, . . . 346-N (shown in phantom) in the other flywheel systems 106-2, 106-3, 106-4, . . . 106-N. In still other alternative embodiments, the motor/generator controller 332 receives additional operational parameter signals associated with each of the flywheel systems 106-1, 106-2, 106-3, . . . 106-N.

In response to the above-mentioned signals, the motor/generator controller 306 configures the motor/generator 332 to operate in either the motor mode or the generate mode, and implements either a motor control law 311 or a generator control law 313, respectively. In addition to configuring the motor/generator 332 to operate in either the motor mode or the generate mode, the motor/generator controller 306 controls motor/generator operation so that the voltage of the electrical distribution system 114 is regulated. The specific configuration of each motor/generator controller 306, according to a particular preferred embodiment that implements this functionality will now be described. It will be appreciated that, for clarity and ease of description, the motor/generator controller 306 being described is the one that forms a part of the first energy storage flywheel system 106-1.

Figure 4:
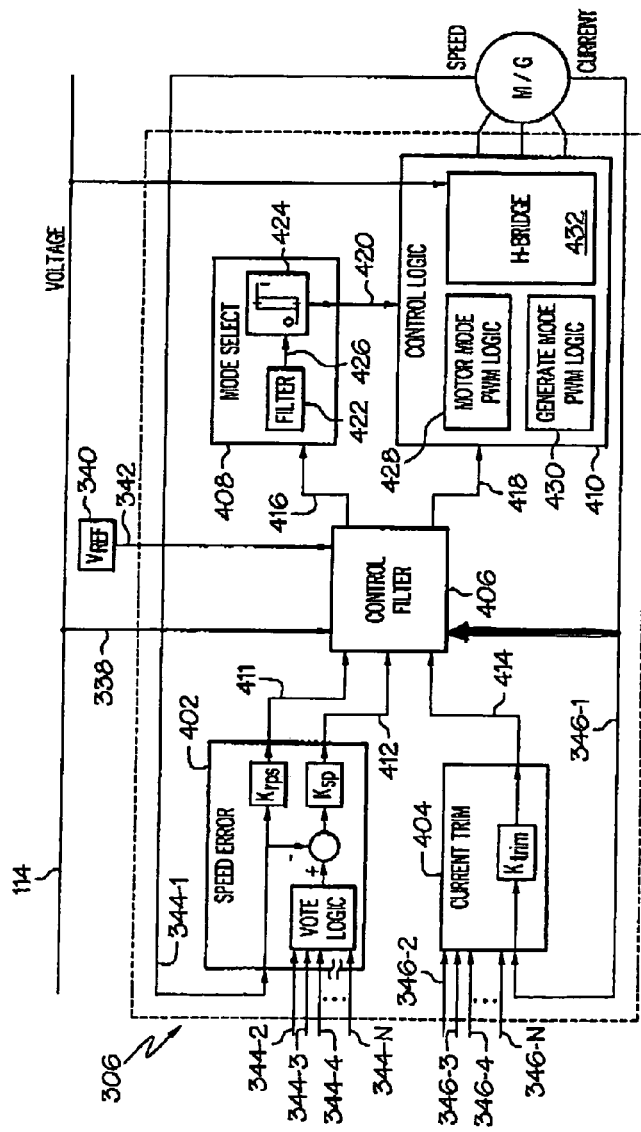
FIG. 4 is a functional block diagram of at least a portion of a motor/generator controller that is used to implement voltage regulation in the system of FIG. 1.

With reference now to FIG. 4, which is a functional block diagram of a particular preferred motor/generator controller 306, it is seen that the motor/generator controller 306 includes a speed error circuit 402, a current trim circuit 404, a control filter circuit 406, a mode select circuit 408, and a control logic circuit 410. It will be appreciated that, although each of these circuits is depicted and described as individual circuits, one or more, or even all, of the circuit blocks that make up the motor/generator controller 306 could be integrally formed as part of a single circuit.

Turning now to each of the functional circuit blocks, it is seen that the speed error circuit 402 receives the rotational speed signals 344-2, 344-3, 344-4, . . . 344-N from each of the other flywheel systems 106-2, 106-3, 106-4, . . . 106-N and, based on voting logic implemented in the circuit 402, selects one of the speed signals 344 for further processing. It will be appreciated that the voting logic implemented by the speed error circuit 402 may be any one of numerous known voting logic schemes, and that the logic may be implemented in hardware, software, firmware, or any combination thereof. In a particular preferred embodiment, in which three flywheel systems 106 are simultaneously coupled to the electrical power distribution system 114, the voting logic is implemented so as to select the speed signal 344 that has the intermediate value.

The speed error circuit 402 also receives a rotational speed signal 344-1 from its own flywheel system 106-1, which is referred to herein as the channel speed signal 344-1. The channel speed signal 344-1 is, among other things, compared with the speed signal 344 selected by the voting logic, to produce a speed error signal. The speed error signal is appropriately tried, and the trimmed speed error signal 412 is supplied to the control filter circuit 406. The speed error circuit 402 also trims the channel speed signal 344-1 and supplies a trimmed channel speed signal 411 to the control filter circuit 406. This trimmed channel speed signal 411 compensates for the back-EMF (electromotive force) generated in the motor/generator 332.

The current trim circuit 404 receives a current signal 346-1 from its own motor/generator 332, which is referred to herein as the channel current signal 346-1. The current trim circuit 404 appropriately trims the channel current signal 346-1 and supplies the trimmed channel current signal 414 to the control filter circuit 406. As was alluded to above, the current trim circuit 404 could also be implemented as a current vote-and-trim circuit. In such an embodiment, the circuit 404 receives the motor/generator current signals 346-2, 346-3, 346-4, . . . 346-N from each of the other flywheel systems 106-2, 106-3, 106-4, . . . 106-N and, based on voting logic that, for example, is similar to that implemented in the speed error circuit 402, selects one of the motor/generator current signals 346 for further processing by the control filter circuit 406.

The control filter circuit 406 receives the electrical distribution system bus voltage signal 338, the reference voltage signal 342, the trimmed speed error signal 412, the channel current signal 346-1, and the trimmed channel current signal 414. In response to these signals, the control filter circuit 406 supplies appropriate signals to the mode select circuit 408, and to the control logic circuit 410. In particular, the control filter circuit 406 supplies a voltage error signal 416 to the mode select circuit 408, and operational control signals 418 to the control logic circuit 410. The control filter circuit 406 may be implemented in software, hardware, firmware, or a combination thereof, using any one of numerous software algorithms and/or circuit configurations. A particular preferred circuit implementation of the control filter circuit 406 is depicted in functional block diagram form in FIG. 5 and, before describing the remaining circuits that make up the motor/generator controller 308, will be described.

Figure 5:
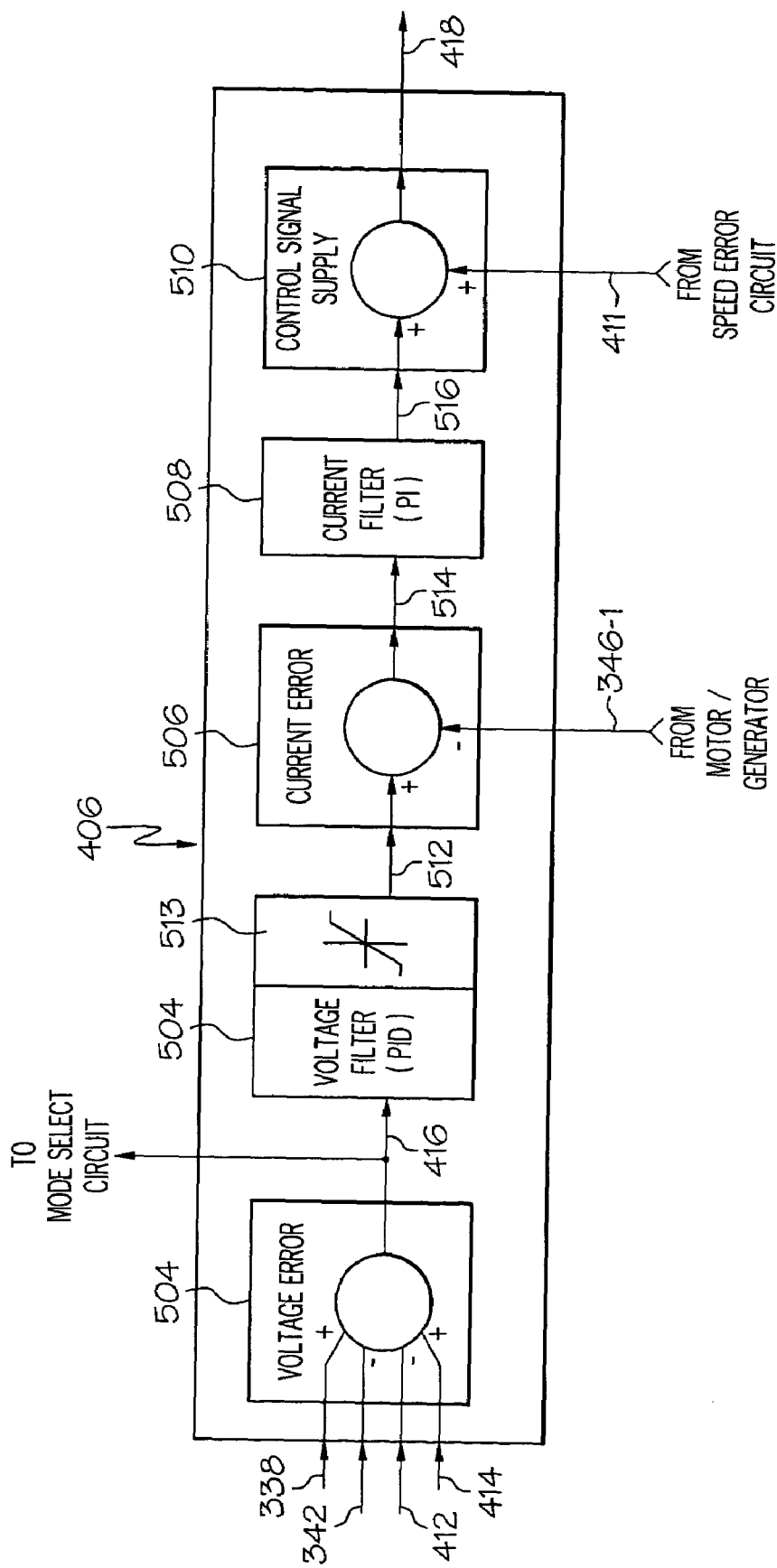
FIG. 5 is a detailed block diagram of an exemplary preferred embodiment of the motor/generator controller shown in FIG. 4.

As shown in FIG. 5, the control filter circuit 406 includes a voltage error circuit 502, a voltage filter circuit 504, a current error circuit 506, a current filter circuit 508, and a control signal supply circuit 510. The voltage error circuit 502 receives the electrical distribution system bus voltage signal 338, the reference voltage signal 342, the trimmed speed error signal 412, and the trimmed channel current signal 414. The voltage error circuit 502 selectively adds or subtracts each of these signals, and supplies the voltage error signal 416 to both the mode select circuit 408 (described further below) and to the voltage filter circuit 504. In the depicted embodiment, the voltage error circuit 502 adds the electrical distribution system bus voltage signal 338 and the trimmed speed error signal 412, and subtracts the reference voltage signal 342 and the trimmed channel current signal 414, to provide the voltage error signal 416.

The voltage filter circuit 504, which is preferably, though not necessarily, implemented as a PID (proportional-integral-derivative) filter, receives and filters the voltage error signal 416 supplied from the voltage comparator circuit 502, and supplies a current command signal 512 to the current error circuit 506. It will be appreciated that the PID filter preferably implements saturation limits 513, so that the commanded current will not exceed a predetermined magnitude.

The current command signal 512 and the channel current signal 346-1 are both supplied to the current error circuit 506. The current error circuit 506, subtracts the channel current signal 346-1 from the current command signal 512, and supplies a current error signal 514 to the current filter circuit 508.

The current filter circuit 508 is coupled to receive the current error signal 514 from the current error circuit 506. The current filter circuit 508 filters the current error signal 514 and supplies a speed command signal 516 to the control signal supply circuit 510. In the depicted embodiment, the current filter circuit 508 is implemented as a PI (proportional-integral) filter, though it will be appreciated that it, like the voltage filter circuit 504, may be implemented as any one of numerous other filter configurations.

The control signal supply circuit 510 is coupled to receive the speed command signal 516 from the current filter 508 and the trimmed channel speed signal 411. The control signal supply circuit 510 adds these two signals together, and generates the operational control signals 418, which are in turn supplied to the control logic circuit 410.

Returning now to FIG. 4, the remaining circuits that make up the motor/generator controller 308, namely the mode select circuit 408 and the control logic circuit 410, will now be described.

The mode select circuit 408, as was noted above, is coupled to receive the voltage error signal 416 from the control filter circuit 406. In response to the voltage error signal 416, the mode select circuit supplies a mode configuration control signal 420 to the control logic circuit 410. It will be appreciated that the mode select circuit 408 may be implemented in software, hardware, firmware, or a combination thereof, using any one of numerous software algorithms and/or circuit configurations. In the depicted embodiment, the mode select circuit 408 includes a filter circuit 422 and a switching circuit 424 that is preferably implemented with hysteresis. The filter circuit 422 supplies a filtered voltage error signal 426 to the switching circuit 424. The switching circuit 424 in turn supplies the mode configuration control signal 420 to the control logic circuit 410. In the depicted embodiment, the mode select circuit 408 functions such that the mode configuration control signal 420 is a binary signal. For example, in the depicted embodiment, if the filtered voltage error signal 426 is at or above a predetermined threshold value, then the configuration control signal 420 is a logic "high" value (e.g., a logic "1"), and the control logic circuit 410, described more fully below, is configured to control the motor/generator 332 in the motor mode. Conversely, if the filtered voltage error signal 426 is at or below a predetermined threshold value, then the configuration control signal 420 is a logic "low" value (e.g., a logic "0"), and the control logic circuit 410 is configured to control the motor/generator 332 in the motor generate.

The control logic circuit 410 receives the mode configuration control signal 420 from the mode select circuit 408, and the operational control signals 418 from the control filter circuit 406. In response to the mode configuration control signal 420, the control logic circuit 410 will control the motor/generator 332 in either the motor mode, in which power is supplied to the motor/generator 332 from the electrical power distribution system 114, or the generate mode, in which power is supplied from the motor/generator 332 to the electrical power distribution system 114.

In response to the operational control signals 418, the control logic circuit 410 controls the flow of power supplied to (if in motor mode), or from (if in generator mode), the motor/generator 332, to regulate electrical distribution system bus voltage to within a predetermined tolerance band. For example, the bus voltage may be regulated to within ±5% of the reference voltage magnitude. It will be appreciated that the control logic circuit 410 may be implemented in software, hardware, firmware, or a combination thereof, using any one of numerous software algorithms and/or circuit configurations. It will additionally be appreciated that the control logic circuit 410 may implement any one of numerous known control schemes including, but not limited to, boost, buck, and buck-boost control schemes. In the depicted embodiment, the control logic circuit 410 includes a motor mode PWM (pulse width modulation) logic circuit 428, a generate mode PWM logic circuit 430, and a plurality of power amplifiers coupled in a three-phase H-bridge configuration 432. The control logic circuit 410, in response to the control command signals 418 implements a buck-boost control scheme by varying the duty cycle of the appropriate PWM logic circuits 428, 430.

The system and method described above allows energy storage flywheel system motor/generators to be controlled such that motor/generator voltage is regulated, while simultaneously providing balanced load sharing amongst a plurality of flywheel systems.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A system for regulating voltage in an electrical supply system, comprising:
   a plurality of energy storage flywheels;
   a plurality of motor/generators, each motor/generator coupled to one of the energy storage flywheels and to the electrical supply system and configured to operate in either (i) a motor mode, whereby electrical energy from the electrical supply system is converted to rotational kinetic energy and supplied to its respective energy storage flywheel or (ii) a generate mode, whereby rotational kinetic energy from its respective energy storage flywheel is converted to electrical energy and supplied to the electrical supply system, each motor/generator further configured to supply a plurality of signals, each signal representative of a motor/generator operational parameter; and
   a plurality of motor/generator controllers, each motor/generator controller coupled to receive a plurality of the motor/generator operational parameter signals from each of the motor/generators and operable, in response thereto, to control operation of one of the motor/generators in either the motor mode or the generate mode, to thereby regulate the electrical supply system voltage and substantially equally share electrical load between the motor/generators.

2. The system of claim 1, wherein each motor/generator controller is further operable, in response to the motor/generator operational parameter signals, to configure one of the motor/generators to operate in either the motor mode or the generate mode.

3. The system of claim 2, wherein the motor/generator operational parameter signals supplied by each motor/generator include a motor/generator rotational speed signal, and wherein each motor/generator controller comprises:

a speed comparator circuit coupled to receive the rotational speed signal from each motor/generator and operable, in response thereto, to supply a speed error signal;
   a control filter circuit coupled to receive the speed error signal and operable, in response thereto, to supply operational control signals; and
   a control logic circuit coupled to receive the operational control signals and operable, in response thereto, to control the operation of one of the motor/generators.

4. The system of claim 3, wherein the motor/generator operational parameter signals supplied by each motor/generator further include a motor/generator current signal, and wherein each motor/generator controller further comprises:
   a current trim circuit coupled to receive the motor/generator current signal from one or more of the motor/generators and operable, in response thereto, to supply a trimmed current signal.

5. The system of claim 4, wherein the control filter is further coupled to receive the trimmed current signal and operable, in response to the speed error signal and the trimmed current signal, to supply the operational control signals.

6. The system of claim 5, wherein each motor/generator controller is further coupled to receive a reference voltage signal, and a signal representative of the electrical supply system voltage.

7. The system of claim 6, wherein the speed comparator circuit is further operable to supply a trimmed speed signal based on one of the motor/generator rotational speed signals, and wherein the control filter circuit comprises:
   a voltage error circuit coupled to receive the reference voltage signal, the signal representative of electrical supply system voltage, the speed error signal, and the trimmed current signal from one of the motor generators and operable, in response thereto, to supply a voltage error signal;
   a voltage filter coupled to receive the voltage error signal and operable, in response thereto, to supply a current command signal;
   a current error circuit coupled to receive the current command signal and the motor/generator current signal from one of the motor/generators and operable, in response thereto, to supply a current error signal;
   a current filter coupled to receive the current error signal and operable, in response thereto, to supply a speed command signal; and
   a control signal supply circuit coupled to receive the speed command signal and the trimmed channel speed signal and operable, in response thereto, to supply the operational control signals.

8. The system of claim 7, further comprising:
   an operational mode select circuit coupled to receive the voltage error signal and operable, in response thereto, to supply a mode control signal,
   wherein the control logic circuit is further coupled to receive the mode control signal and operable, in response thereto, to control the operation of one of the motor/generators in either the motor mode or the generate mode.

9. The system of claim 7, wherein the system comprises three or more flywheels, three or motor/generators, and three or more motor/generator controllers.

10. In a system having a plurality of energy storage flywheels configured to supply one or more signals representative of flywheel operational parameters, and a plurality of motor/generators each coupled to one of the energy storage flywheels and an electrical supply system and configured to supply a plurality of signals representative of a motor/generator operational parameter, a method of regulating bus voltage in the electrical supply system, comprising:

controlling each motor/generator based at least in part on a plurality of the motor/generator operational parameter signals supplied from each of the motor/generators to thereby regulate the electrical supply system bus voltage and substantially equally share electrical load between the motor/generators.

11. The method of claim 10, further comprising:

selectively controlling each of the motor/generators in either a motor mode, whereby electrical energy from the electrical supply system is converted to rotational kinetic energy and supplied to an energy storage flywheel, or a generate mode, whereby rotational kinetic energy from an energy storage flywheel is converted to electrical energy and supplied to the electrical supply system.

12. The method of claim 10, wherein the motor/generator operational parameter signals supplied by each motor/generator include a motor/generator rotational speed signal, and wherein the method further comprises:

comparing each motor/generator rotational speed signal with one or more other motor/generator rotational speed signals to determine a speed error for each motor/generator; and controlling each motor/generator based at least in part on its determined speed error.

13. The method of claim 12, wherein the motor/generator operational parameter signals supplied by each motor/generator further include motor/generator current, and wherein the method further comprises:

controlling each motor/generator based at least in part on its determined speed error and its motor/generator current.

14. The method of claim 13, further comprising:

determining a voltage error for each motor/generator based at least in part on a reference voltage, the electrical supply system voltage, its determined speed error, and its determined motor/generator current, determining a desired current magnitude for each motor/generator based at least in part on its determined voltage error;

determining a current error for each motor/generator based at least in part on its desired current magnitude and its motor/generator current;

determining a desired rotational speed for each motor generator based at least in part on the current error;

determining an energization duty cycle time for each motor/generator based at least in part on its desired rotational speed; and supplying electrical power to each motor/generator for its determined energization duty cycle time.

15. The method of claim 14, further comprising:

controlling each motor/generator in either the motor mode or the generator mode based at least in part on its determined voltage error.

16. A satellite, comprising:

an electrical power distribution bus;

a main controller coupled to receive at least a voltage command signal and operable, in response thereto, to supply a voltage reference signal;

a plurality of energy storage flywheels;

a plurality of motor/generators, each motor/generator coupled to one of the energy storage flywheels and to the electrical supply system and configured to operate in either (i) a motor mode, whereby electrical energy from the electrical supply system is converted to rotational kinetic energy and supplied to its respective energy storage flywheel or (ii) a generate mode, whereby rotational kinetic energy from its respective energy storage flywheel is converted to electrical energy and supplied to the electrical supply system, each motor/generator further configured to supply a plurality of signals, each signal representative of a motor/generator operational parameter; and a plurality of motor/generator controllers, each motor/generator controller coupled to receive a plurality of the motor/generator operational parameter signals from each of the motor/generators and the voltage reference signal and operable, in response thereto, to control operation of one of the motor/generators in either the motor mode or the generate mode, to thereby regulate voltage on the electrical power distribution bus and substantially equally share electrical load between the motor/generators.

* * * * *

UNITED STATES PATENT AND TRADEMARK OFFICE
CERTIFICATE OF CORRECTION

| | | |
|---|---|---|
| PATENT NO. | : 7,078,880 B2 | Page 1 of 1 |
| APPLICATION NO. | : 10/641509 | |
| DATED | : July 18, 2006 | |
| INVENTOR(S) | : Calvin C. Potter et al. | |

It is certified that error appears in the above-identified patent and that said Letters Patent is hereby corrected as shown below:

Column 1, add the following paragraph between the Title and Technical Field:

--STATEMENT REGARDING FEDERALLY SPONSORED RESEARCH OR DEVELOPMENT

This invention was made with government support under Agreement No. F29601-01-2-0046 awarded by the U.S. Air Force, Air Force Research Laboratory. The government has certain rights in this invention.--

Column 11, line 2, add the word --each-- after the word "signals".

Signed and Sealed this

Twentieth Day of March, 2007

JON W. DUDAS
*Director of the United States Patent and Trademark Office*